(12) United States Patent  
Gauthier et al.

(10) Patent No.: US 8,584,781 B1  
(45) Date of Patent: Nov. 19, 2013

(54) CONTINUOUSLY VARIABLE TRANSMISSION MOUNTING ASSEMBLY

(75) Inventors: Mathieu Gauthier, Sherbrooke (CA); Sylvain Matte, Saint-Denis-de-Brompton (CA); Max Richer, Valcourt (CA); Gaetan Lecours, Valcourt (CA); Michel Lefebvre, Valcourt (CA)

(73) Assignee: Bombardier Recreational Products Inc., Valcourt (CA)

( * ) Notice: Subject to any disclaimer, the term of this patent is extended or adjusted under 35 U.S.C. 154(b) by 99 days.

(21) Appl. No.: 13/369,775

(22) Filed: Feb. 9, 2012

Related U.S. Application Data

(60) Provisional application No. 61/441,057, filed on Feb. 9, 2011.

(51) Int. Cl.  
*B62M 27/00* (2006.01)

(52) U.S. Cl.  
USPC ........................................................ 180/190

(58) Field of Classification Search  
USPC ........................................ 180/190, 191, 192  
See application file for complete search history.

(56) References Cited

U.S. PATENT DOCUMENTS

| | | | |
|---|---|---|---|
| 7,083,024 B2 | 8/2006 | Bergman et al. | |
| 7,997,372 B2 | 8/2011 | Maltais | |
| 8,037,961 B2 | 10/2011 | Fecteau | |
| 2002/0129982 A1 | 9/2002 | Harle et al. | |
| 2010/0288572 A1* | 11/2010 | Maltais | 180/190 |

* cited by examiner

Primary Examiner — Kevin Hurley  
(74) Attorney, Agent, or Firm — BCF LLP

(57) ABSTRACT

A snowmobile has a frame with an engine compartment and a tunnel, a front suspension, at least one ski, an engine, a bracket having a first portion joined to the engine and a second portion having an aperture defined therein, an output shaft, a countershaft passing through the aperture and being supported by the second portion of the bracket, a motion decoupler disposed in the aperture around the countershaft, the countershaft being rotationally supported in the motion decoupler, a driving pulley disposed on the output shaft, a driven pulley disposed on the countershaft, a drive belt looped around the driving and driven pulleys, and an endless drive track. The driving pulley, the driven pulley and the drive belt together form a continuously variable transmission.

20 Claims, 14 Drawing Sheets

CONTINUOUSLY VARIABLE TRANSMISSION MOUNTING ASSEMBLY

CROSS-REFERENCE

The present application claims priority to U.S. Patent Application No. 61/441,057, filed Feb. 9, 2011, the entirety of which is incorporated herein by reference.

FIELD OF THE INVENTION

The present invention relates to a continuously variable transmission mounting assembly and vehicles incorporating same.

BACKGROUND

Snowmobiles are typically provided with a continuously variable transmission (CVT) to transmit power from the engine of the vehicle to the endless drive track, while changing the speed ratio between the engine and the endless drive track. Advantages of CVTs include smoother acceleration and improved fuel efficiency when compared to other types of transmissions.

Conventionally, snowmobiles have a pair of skis and an endless drive track for propelling the snowmobile, both of which are mounted to a frame of the snowmobile. The frame includes an engine compartment which conventionally has left and right sides, a bottom, a rear (bulkhead), and a front portion. The engine compartment supports power pack components such as an engine, an exhaust pipe, a muffler, a reduction gearing, and a CVT. The frame also includes a tunnel rearward of the engine compartment below which the endless drive track is disposed. The CVT has a driving pulley mounted to an output shaft of the engine, a driven pulley, and a belt looped around the two pulleys. The driven pulley is mounted to a countershaft and has a portion thereof which extends next to a side of the tunnel. The countershaft is operatively connected to the endless drive track so as to drive the endless drive track. U.S. Pat. No. 7,997,372, issued Aug. 16, 2011, the entirety of which is incorporated herein by reference, describes the above features of a snowmobile in more details.

The engine is usually mounted to the engine compartment through rubber mounts to reduce the transmission of vibrations from the engine to the frame. As a result, during operation, the engine moves relative to the frame. Therefore, the engine's output shaft, driving pulley and their common axis of rotation also move relative to the frame. The countershaft is rigidly supported near the engine compartment through bearings; as such its axis of rotation, which is also the axis of rotation of the driven pulley, does not move relative to the frame. As would be understood, this means that the axis of rotation of the driving pulley moves relative to the axis of rotation of the driven pulley. Therefore, the tension and alignment of the belt looped around the driving and driven pulleys changes due to these variations between the axes of rotation of the pulleys. This negatively affects the transfer of torque from the driving pulley to the driven pulley and may cause premature wear of the belt.

One possible solution to the above consists in mounting the engine to the engine compartment by using stiffer engine mounts. However, this results in more vibrations being transferred from the engine to the frame.

Therefore, there is a need for a snowmobile having a CVT mounting assembly which helps reduce the amount of vibration transferred to the frame.

There is also a need for a snowmobile having a CVT mounting assembly which reduces the variations in the distance between the driving and driven pulleys resulting from engine movement relative to the frame of the snowmobile.

SUMMARY

It is an object of the present invention to ameliorate at least some of the inconveniences present in the prior art.

A snowmobile having a CVT is provided. The countershaft supporting the driven pulley of the CVT is supported in a bracket joined to the engine. Since the bracket is joined to the engine, the countershaft moves with the engine. To account for axial inclination and deviation of the countershaft axis resulting from the operative connection of the countershaft to the endless drive track of the snowmobile, a damper is disposed between the countershaft and the bracket. Even though the damper allows for some movement of the countershaft relative to the output shaft of the engine, the variation in distance between the output shaft and the countershaft is less than that resulting from supporting the countershaft on the frame as in the prior art.

In one aspect, a snowmobile having a frame is provided. The frame includes an engine compartment and a tunnel rearward of the engine compartment. The snowmobile also has a front suspension connected to the frame, at least one ski connected to the front suspension, an engine disposed in the engine compartment, a bracket having a first portion joined to the engine and a second portion having an aperture defined therein, an output shaft driven by the engine, a countershaft passing through the aperture and being supported by the second portion of the bracket, a motion decoupler disposed in the aperture around the countershaft radially between the countershaft and the second portion of the bracket, the countershaft being rotationally supported in the motion decoupler, a driving pulley disposed on the output shaft and rotating therewith, a driven pulley disposed on the countershaft and rotating therewith, and a drive belt looped around the driving and driven pulleys to transfer torque from the driving pulley to the driven pulley. The driving pulley, the driven pulley and the drive belt together form a continuously variable transmission. The snowmobile also has an endless drive track disposed below the tunnel for propelling the snowmobile, the endless drive track being operatively connected to the countershaft.

In a further aspect, the driving and driven pulleys are disposed on a first side of the engine and a reduction gearing is operatively connected to the countershaft on a second side of the engine opposite the first side.

In an additional aspect, a drive axle is disposed in the tunnel. the drive axle is operatively connected to the reduction gearing for driving the endless drive track.

In a further aspect, a spherical bearing rotationally connects the countershaft to the reduction gearing.

In an additional aspect, the countershaft is disposed rearwardly of the output shaft.

In a further aspect, a bearing is disposed radially between the countershaft and the motion decoupler.

In an additional aspect, the motion decoupler is press-fit on the bearing.

In a further aspect, the bearing is a ball bearing.

In an additional aspect, the motion decoupler is a damper.

In a further aspect, the damper includes a rubber ring.

In an additional aspect, the damper further includes a first metal ring and a second metal ring. The rubber ring is disposed radially between the first and second metal ring.

In a further aspect, a cap is fastened to the second portion of the bracket and retains the motion decoupler in the aperture.

In an additional aspect, a vibration damper connects the second portion of the bracket to the tunnel.

In a further aspect, a central axis of the vibration damper passes through the countershaft.

In an additional aspect, a drive axle is disposed in the tunnel. The drive axle is operatively connected to the reduction gearing for driving the endless drive track. A central axis of the vibration damper passes in front of the drive axle.

In a further aspect, the vibration damper is disposed rearwardly of the countershaft.

In an additional aspect, a drive axle is disposed in the tunnel. The drive axle is operatively connected to the reduction gearing for driving the endless drive track. The vibration damper is disposed forwardly of the drive axle.

In a further aspect, the first portion of the bracket is fastened to a side of the engine.

In an additional aspect, the aperture is a first aperture, the first portion of the bracket defines a second aperture therein, and the output shaft passes through the second aperture.

In a further aspect, the countershaft has an axis of rotation. The motion decoupler allows for at least one of axial deviation and inclination of the axis of the countershaft relative to the bracket.

For purposes of this application, terms related to spatial orientation such as forwardly, rearwardly, upwardly, downwardly, left, and right, are as they would normally be understood by a driver of the vehicle sitting thereon in a normal riding position.

Embodiments of the present invention each have at least one of the above-mentioned object and/or aspects, but do not necessarily have all of them. It should be understood that some aspects of the present invention that have resulted from attempting to attain the above-mentioned object may not satisfy this object and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION

Aspects of the present continuously variable transmission mounting assembly will be described with respect to a snowmobile 10. However it is contemplated that aspects of the present continuously variable transmission mounting assembly could also be applied to other types of vehicles provided with CVTs.

Figure 1:
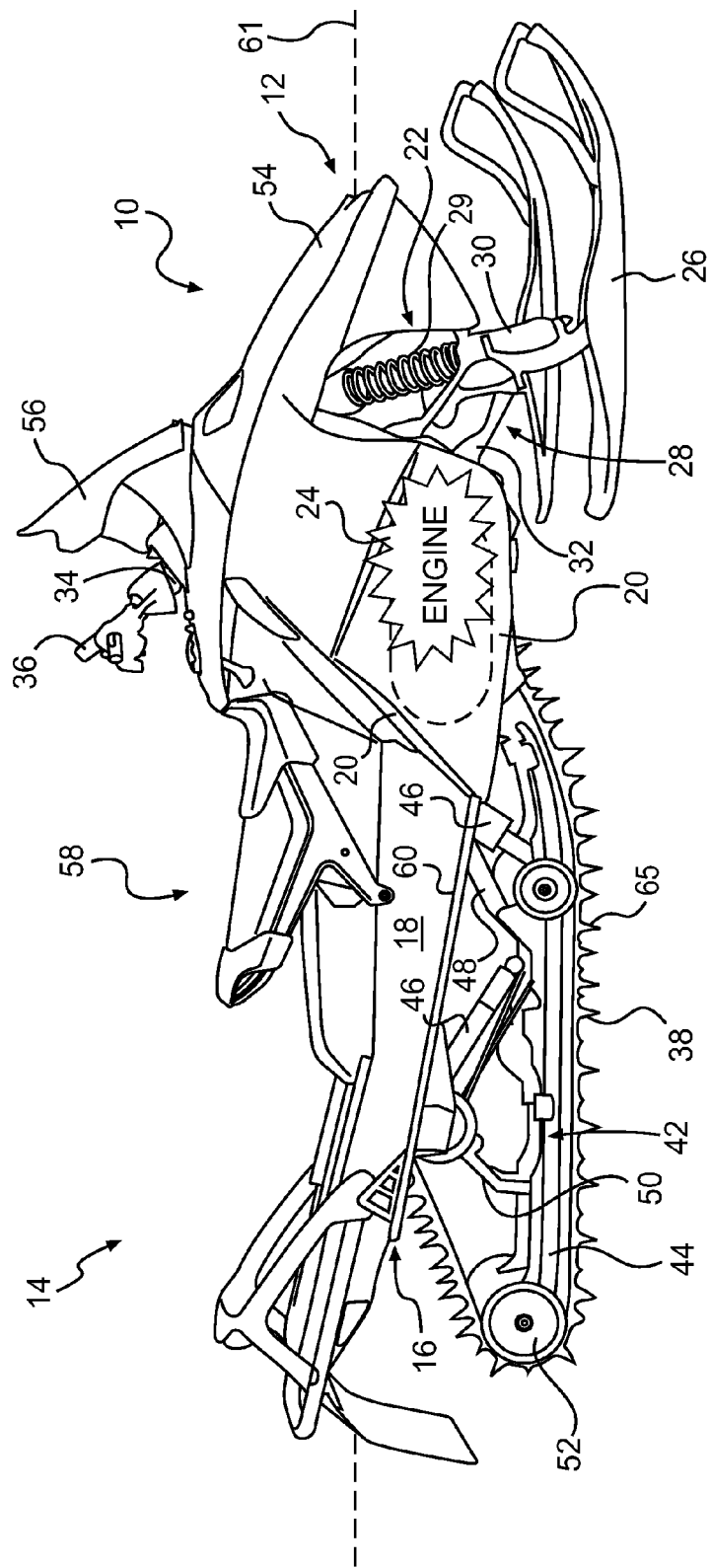
FIG. 1 is a right side elevation view of a snowmobile.

As seen in FIG. 1, the snowmobile 10 includes a forward end 12 and a rearward end 14 that are defined consistently with a travel direction of the snowmobile 10. The snowmobile 10 includes a frame 16 that includes a tunnel 18 and an engine compartment 20 as described in greater detail below. A front suspension 22 is connected to the frame. The tunnel 18 generally consists of one or more pieces of sheet metal bent to form an inverted U-shape. The tunnel 18 extends rearwardly along the longitudinal centerline 61 of the snowmobile 10 and is connected at the front to the engine compartment 20. An engine 24, which is schematically illustrated in FIG. 1, is carried by the engine compartment 20 of the frame 16. A steering assembly (not indicated) is provided, in which two skis 26 are positioned at the forward end 12 of the snowmobile 10 and are attached to the front suspension 22 through a pair of front suspension assemblies 28. Each front suspension assembly 28 includes a ski leg 30, a pair of A-arms 32 and a shock absorber 29 for operatively connecting the respective skis 26 to a steering column 34. Other types of front suspension assemblies 28 are contemplated, such as a swing-arm or a telescopic suspension. A steering device in the form of handlebar 36, positioned forward of a rider, is attached to the upper end of the steering column 34 to allow the rider to rotate the ski legs 30 and thus the skis 26, in order to steer the snowmobile 10. U.S. Pat. No. 8,037,961, issued Oct. 18, 2011, the entirety of which is incorporated by reference, provides additional details regarding a steering assembly and front suspension assemblies suitable for the snowmobile 10.

An endless drive track 65 is positioned at the rear end 14 of the snowmobile 10. The endless drive track 65 is disposed generally under the tunnel 18, and is operatively connected to the engine 24 as will be described in greater detail below. The endless drive track 65 is driven to run about a rear suspension assembly 42 for propelling the snowmobile 10. The rear suspension assembly 42 includes a pair of slide rails 44 in sliding contact with the endless drive track 65. The rear suspension assembly 42 also includes one or more shock absorbers 46 which may further include a coil spring (not shown) surrounding the individual shock absorbers 46. Suspension arms 48 and 50 are provided to attach the slide rails 44 to the frame 16. One or more idler wheels 52 are also provided in the rear suspension assembly 42.

At the front end 12 of the snowmobile 10, fairings 54 enclose the engine 24, thereby providing an external shell that not only protects the engine 24, but also make the snowmobile 10 more aesthetically pleasing. The fairings 54 include a hood (not indicated) and one or more side panels that can be opened to allow access to the engine 24 when this is required, for example, for inspection or maintenance of the engine 24. In the particular snowmobile 10 shown in FIG. 1, the side panels can be opened along a vertical axis to swing away from the snowmobile 10. A windshield 56 is connected to the fairings 54 near the front end 12 of the snowmobile 10 or alternatively directly to the handlebar 36. The windshield 56 acts as a wind screen to lessen the force of the air on the rider while the snowmobile 10 is moving.

A straddle-type seat 58 is positioned atop the frame 16. A rear portion of the seat 58 may include a storage compartment or can be used to accommodate a passenger seat (not indicated). Two footrests 60 are positioned on opposite sides of the snowmobile 10 below the seat 58 to accommodate the driver's feet.

Figure 4:
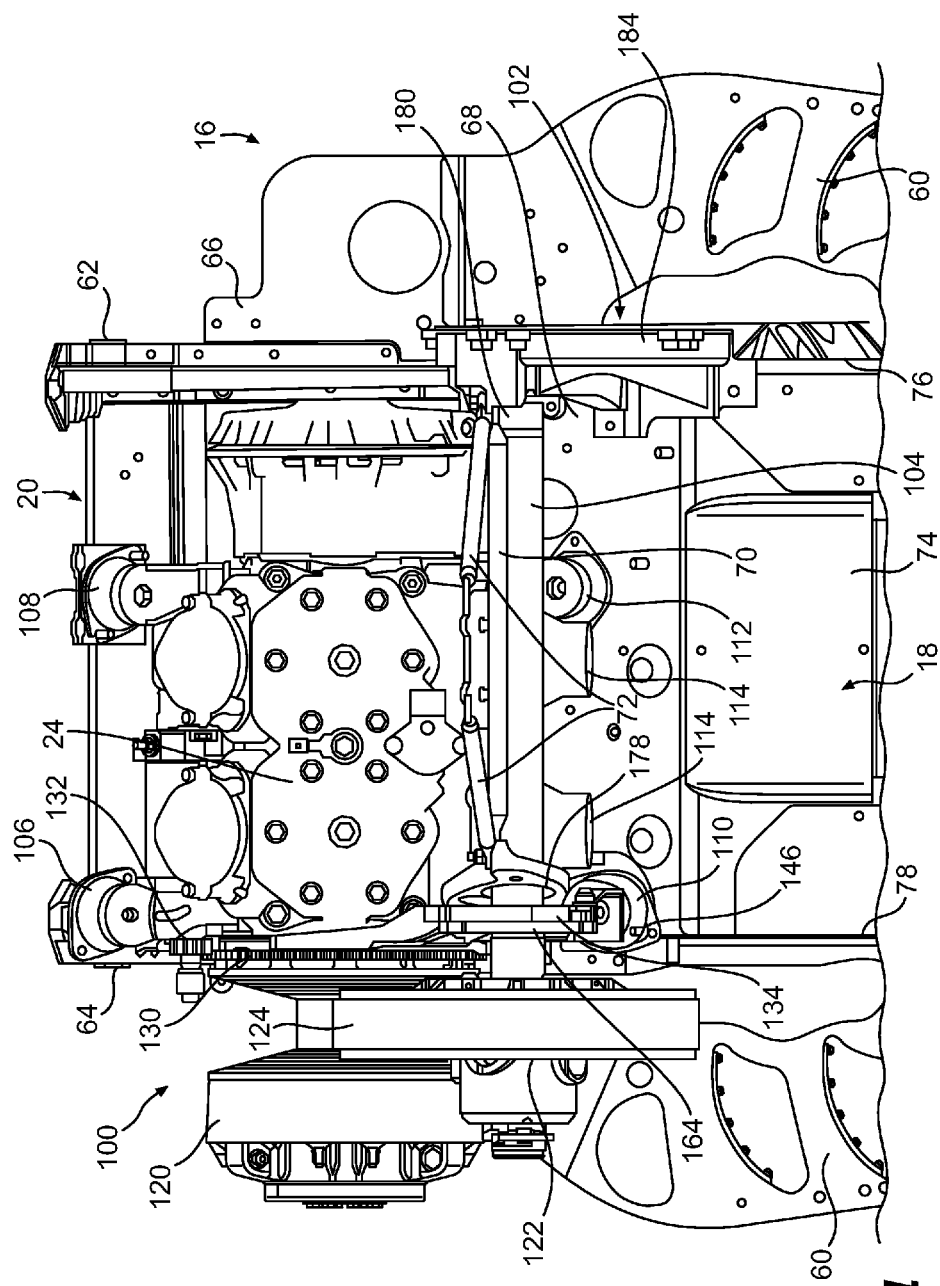
FIG. 4 is a top plan view of the forward portion of the frame and the power pack of FIG. 2.
Figure 5:
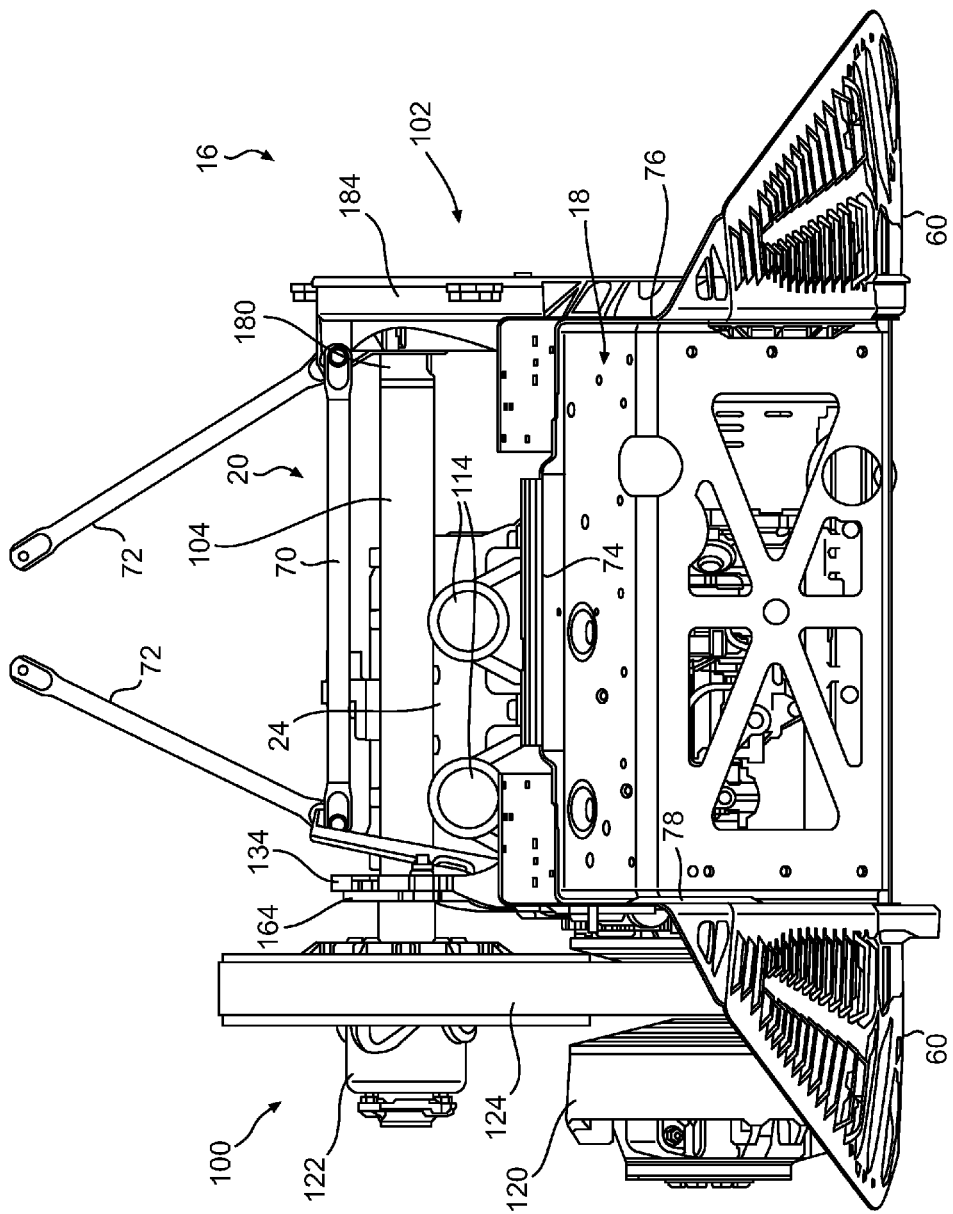
FIG. 5 is a rear elevation view of the frame and the power pack of the snowmobile of FIG. 1, with portions of the frame removed for clarity.
Figure 6:
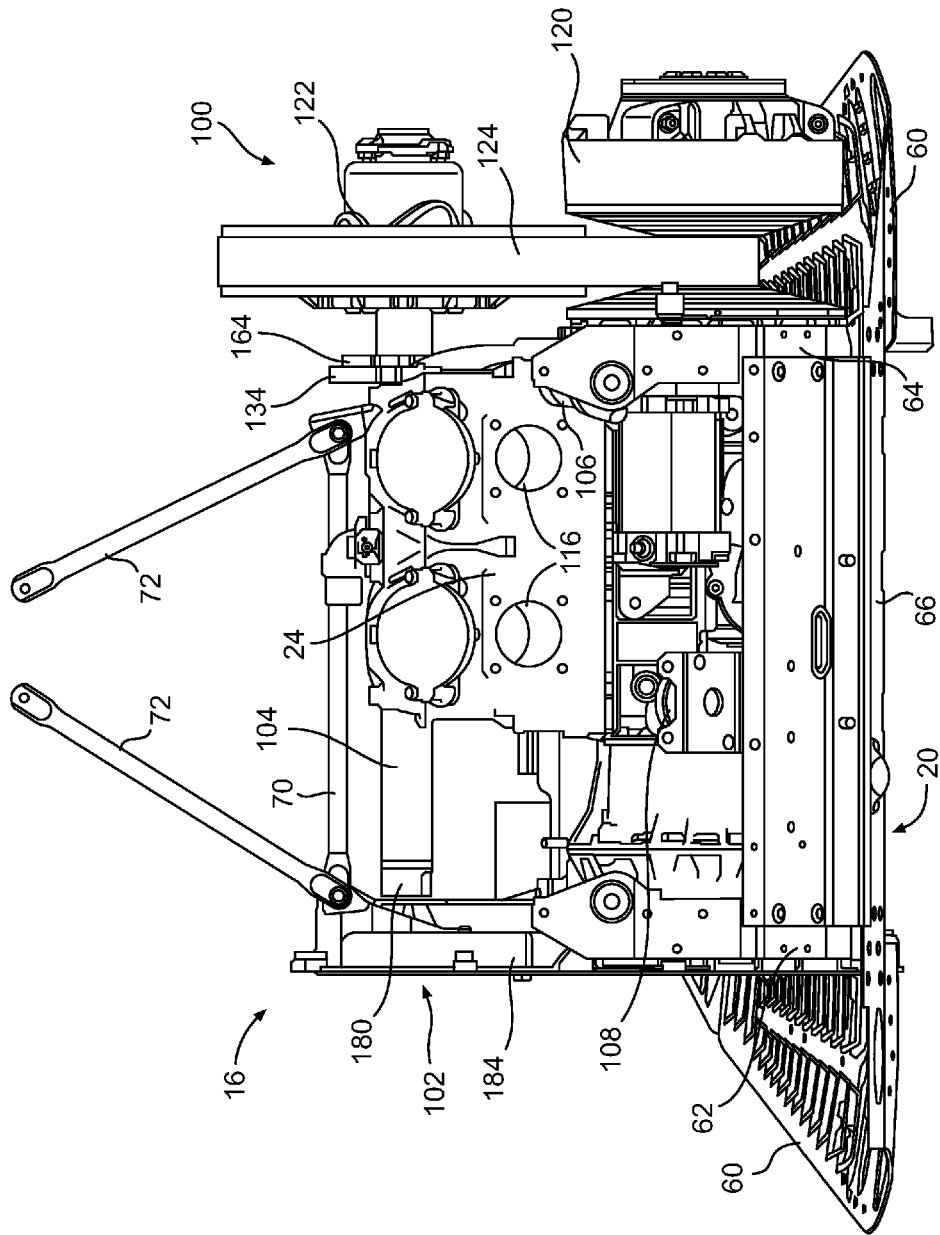
FIG. 6 is a front elevation view of the frame and the power pack of FIG. 5.

The configuration of engine compartment 20 will now be described with respect to FIGS. 2 to 8. The engine compartment 20 includes a right side wall 62, a left side wall 64, and an engine compartment bottom 66. The side walls 62, 64 are generally vertical and generally parallel to the longitudinal centerline 61. The engine compartment bottom 66 is generally horizontal and extends transversely between and beyond the side walls 62, 66. A bulkhead 68 (FIG. 4) has one side connected to a rear portion of the right side wall 62, the other side connected to a rear portion of the left side wall 64, and a bottom connected to a rear portion of the engine compartment bottom 66. The right and left side walls 62, 64, the engine compartment bottom 66, and the bulkhead 68 are made from bent sheet metal or by casting, and are connected to each other by fasteners such as rivets or bolts. As seen in FIGS. 4 and 6, the engine 24 is disposed transversely between the right and left side walls 62,64 and forwardly of the bulkhead 68.

The upper portion of the engine compartment 20 has a number of frame members that form together a pyramidal-like structure that enhances the torsional and structural rigidity of the frame 16. Of these, only a rear cross-member 70 (see FIG. 5) and a pair of columns 72 are shown for clarity. The frame members are made of aluminum tubing, but other structures and materials are also contemplated.

The engine compartment 20 has other elements and features not described herein for simplicity and clarity, such as, but not limited to, a front sub-frame member connected to the side walls 62, 64 forwardly thereof which is used to connect the front suspension assemblies 28.

The tunnel 18 of the frame 16 is made of three parts. The tunnel 18 has a central tunnel portion 74, a right side tunnel portion 76, and a left side tunnel portion 78. The central tunnel portion 74 is disposed generally horizontally and has an integrated heat exchanger (not shown) that is used to cool the engine coolant. It is contemplated that the heat exchanger could be fastened to a bottom of the central tunnel portion 74 or could be disposed elsewhere on the frame 16. The front portion of the central tunnel portion 74 is connected to a rear portion of the bulkhead 68 via fasteners. It is contemplated that the front portion of the central tunnel portion 74 could alternatively be connected to a rear portion of the bulkhead 68 by welding. The right and left side tunnel portions 76, 78 are disposed generally vertically and each have a footrest 60 extending outwardly from a bottom portion thereof. The right side tunnel portion 76 and the left side tunnel portion 78 are connected to the central tunnel portion 74 via flanges extending inwardly from a top of the side tunnel portions 76, 78.

A power pack for powering the endless drive track 65 will now be described with reference to FIGS. 2 to 10. The power pack includes, but is not limited to, the engine 24, a variable ratio belt transmission system, also known as a continuously variable transmission or CVT 100, a reduction gearing 102, and a countershaft 104.

Figure 9:
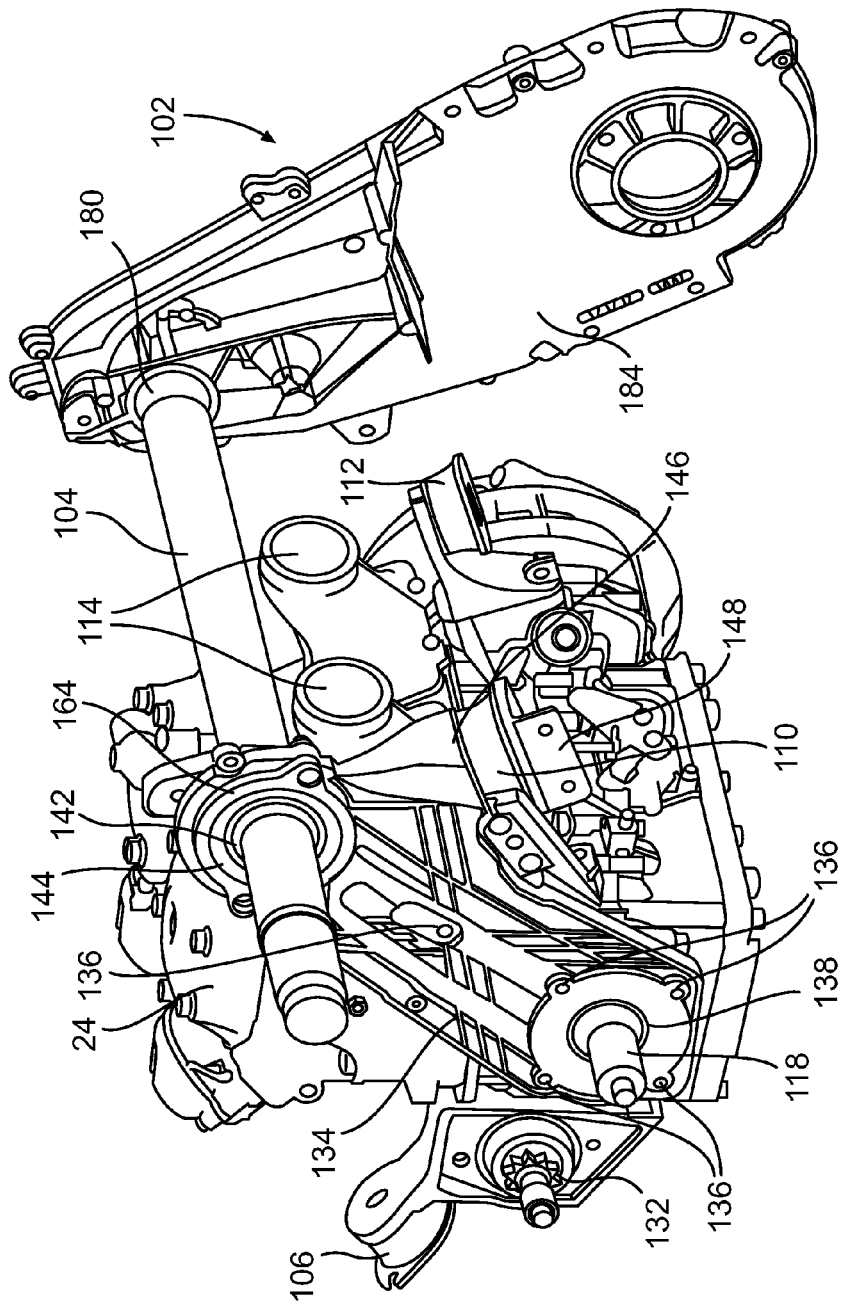
FIG. 9 is a perspective view taken from a rear left side of the engine, countershaft and reduction gearing of the snowmobile of FIG. 1.

The engine 24 is a two cylinder, two-cycle internal combustion engine. It is contemplated that the engine 24 could be of any other type, such as a four-cycle internal combustion engine. The engine 24 is disposed in the engine compartment 20 and rests on vibration dampers 106, 108, 110, 112 (best seen in FIG. 4) to reduce the transmission of vibrations from the engine 24 to the frame 16. The vibration dampers 106, 108, 110 and 112 are rubber mounts. As best seen in FIG. 9, the engine 24 has a plurality of air intakes 114 (one per cylinder) on a rear side thereof. An air intake manifold (not shown) is connected to the rear side of the engine 24 so as to fluidly communicate with the air intakes 114. Two air intake controllers (not shown) fluidly communicate with the air intake manifold. It is contemplated that only one air intake controller could be used. The air intake controllers each comprise a valve (not shown) that controls the flow of air to the engine 24. It is contemplated that the air control devices could be in the form of a carburetor or a throttle body. A plurality of exhaust ports 116 (one per cylinder, see FIG. 6) is disposed on a front side of the engine 24. An exhaust system (not shown) fluidly communicates with the engine 24 to exhaust the gases from the combustion process. The engine 24 comprises a crankshaft (not shown) that drives an output shaft 118 (see FIG. 9). The crankshaft and output shaft 118 are coaxial and rotate about a common horizontally disposed axis that extends generally transversely to the longitudinal centerline 61 of the snowmobile 10. It is contemplated that the crankshaft and output shaft 118 could be offset from one another and could also rotate at different speeds relative to one another. It is also contemplated that the crankshaft and the output shaft 118 could be integrally formed as a single shaft. As would be known by those skilled in the art, the engine 24 includes other systems, such as the fuel and electrical systems, but these have not been illustrated or described herein for simplicity.

Figure 2:
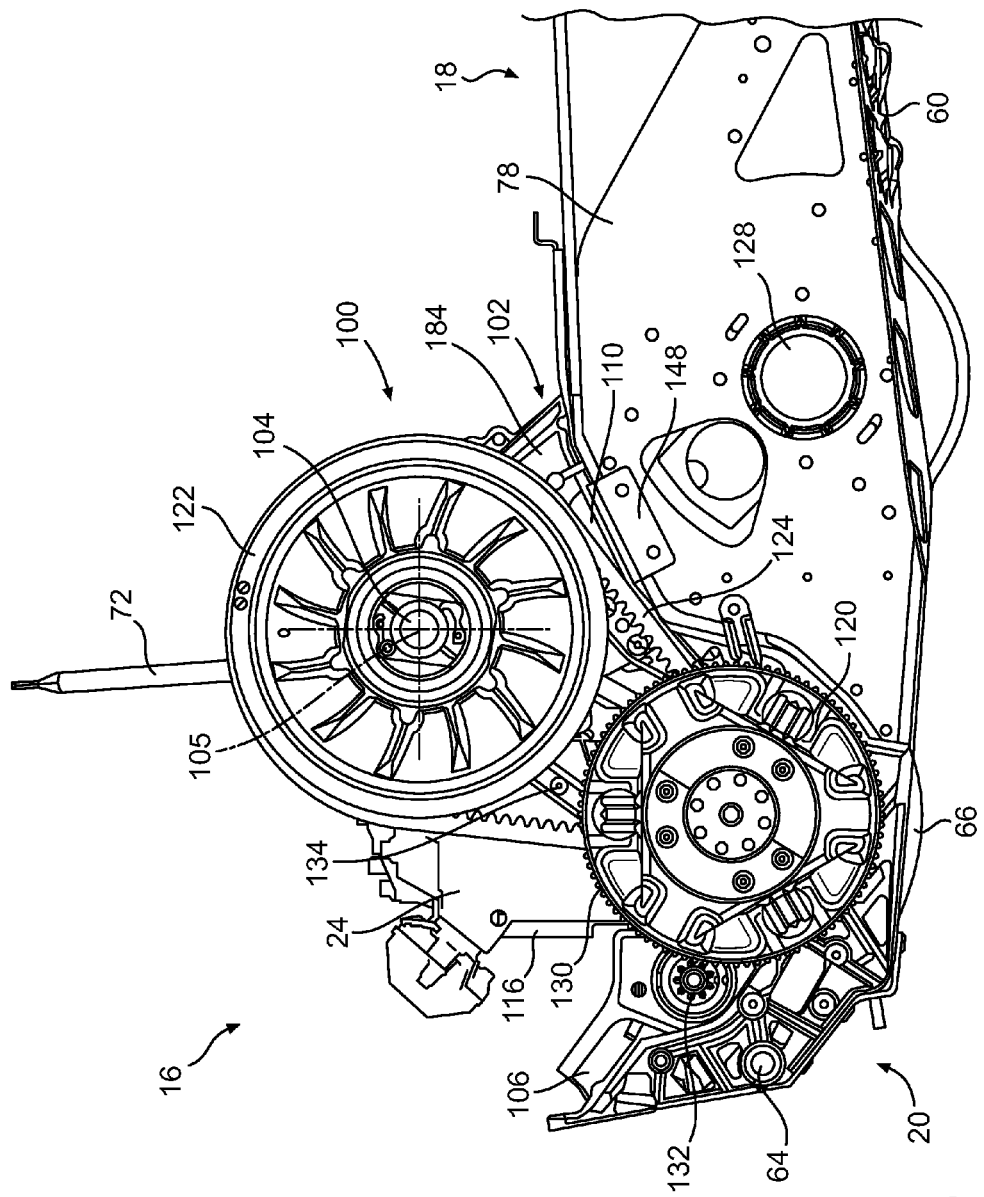
FIG. 2 is a left side elevation view of a forward portion of a frame and a power pack of the snowmobile of FIG. 1, with portions of the frame removed for clarity.
Figure 3:
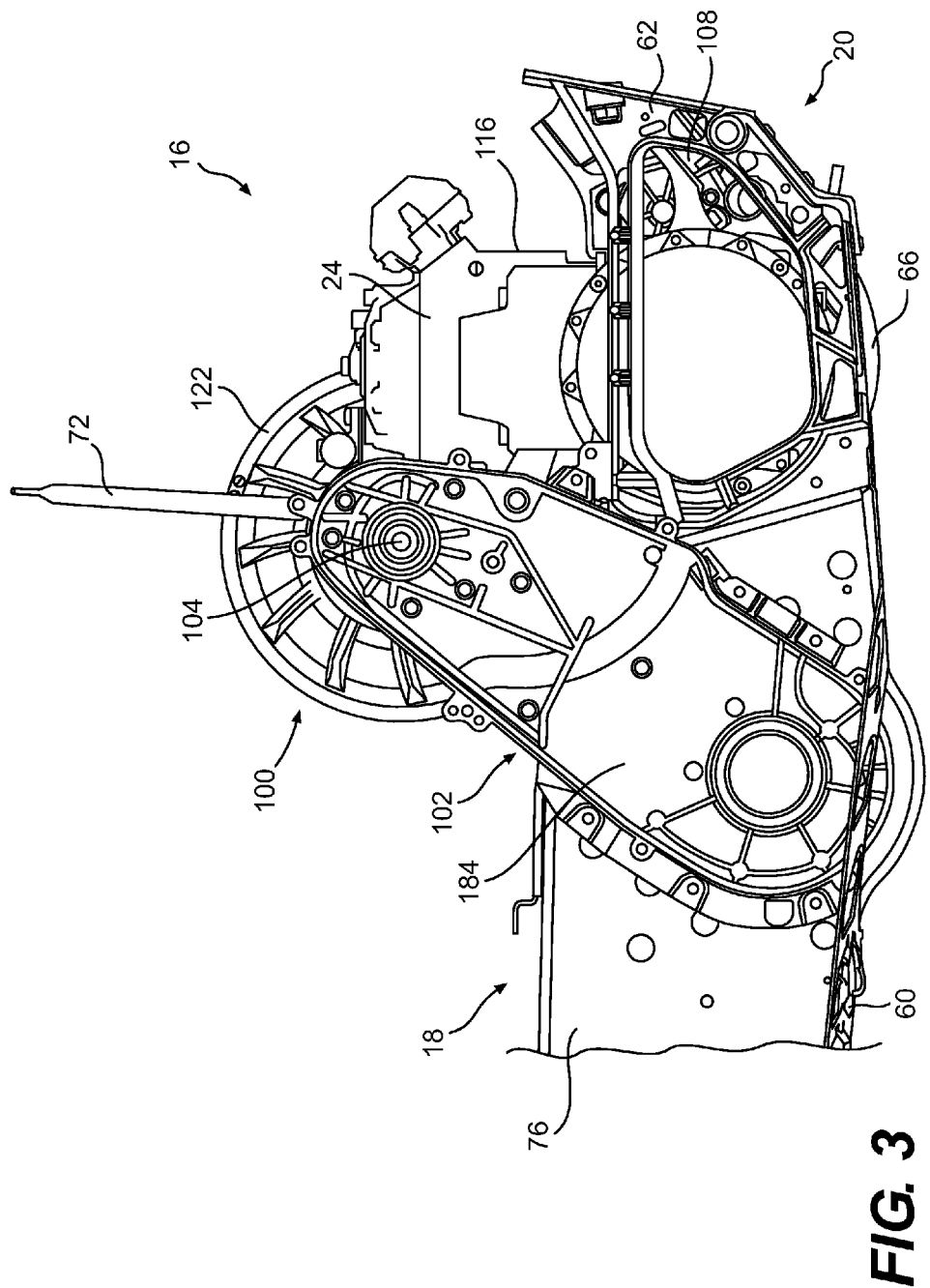
FIG. 3 is a right side elevation view of the forward portion of the frame and the power pack of FIG. 2.

As can be seen in FIGS. 2 and 6, the CVT 100 is disposed on a left side of the engine 24 and includes a driving pulley 120 coupled to rotate with the output shaft 118 of the engine 24 and a driven pulley 122 coupled to the left end of the transversely mounted countershaft 104. The manner in which the countershaft 104 is supported in the engine compartment 20 will be described in greater detail below. As can be seen, the countershaft 104 traverses the width of the engine compartment 20. The countershaft 104 is disposed rearwardly of the engine 24, vertically higher than the air intakes 114. The countershaft 104 is also disposed vertically higher than the tunnel 18. In this position of the countershaft 104, the driven pulley 122 is in proximity to the driving pulley 120, which ensures a good torque transfer from the driving pulley 120 to the driven pulley 122.

The driving pulley 120 of the CVT 100 is coupled to rotate with the output shaft 118 of the engine 24 and includes a pair of opposed frustoconical belt drive sheaves (one fixed sheave and one moving sheave) between which the drive belt 124 is located. The sheaves are biased apart, and the driving pulley 120 incorporates a centrifugally operated mechanism that acts to urge the moving sheave towards the fixed sheave with a force that increases with increasing output shaft speed so that as the engine speed increases, the reduction ratio of the CVT 100 decreases. The driven pulley 122 is coupled to rotate with the countershaft 104 and includes a pair of frustoconical belt drive sheaves between which the drive belt 124 is located. The driven pulley 122 reacts to the torque from the endless drive track 65 by separation of its sheaves which allows the drive belt 124 to engage the driven pulley 122 at a diameter that is progressively reduced as the torque increases or that is progressively increased as the torque decreases. When the driving pulley 120 increases its diameter, the driven pulley 122 decreases its effective diameter and vice versa, thus keeping the drive belt 124 in tension. The drive belt 124 is made of rubber, but it is contemplated that it could be made of metal.

A reduction gearing 102 is disposed on a right side of the engine 24. The right end of the countershaft 104 is connected to an input member of the reduction gearing 102. The input member of the reduction gearing 102 consists of a small sprocket 126 (see FIG. 10) connected to the countershaft 104 as will be described in greater detail below. An output member of the reduction gearing 102 is connected to a front drive axle 128 (FIG. 2). The output member consists of sprocket (not shown) that is larger than the sprocket of the input member and is connected to the drive axle 128. The output member is driven via a chain (not shown) by the input member. It is also contemplated that the output member could be driven via gears by the input member. The input member, the output member, and the chain are enclosed within the housing of the reduction gearing 102. The front drive axle 128 is disposed in the tunnel 18 and carries sprocket wheels (not shown)) that form a driving connection with the endless drive track 65. The output shaft 118, the countershaft 104, and the front drive axle 128 are arranged such that the countershaft 104 is disposed rearwardly of the output shaft 118 and forwardly of the front drive axle 128.

It is contemplated that the reduction gear 102 could be disposed on the left side of the engine 24 and that the CVT 100 could be disposed on the right side of the engine 24.

The driving pulley 120 rotates at the same speed as the output shaft 118 of the engine 24. The speed of rotation of the countershaft 104 is determined in accordance with the instantaneous ratio of the CVT 100. The drive axle 128 rotates at a lower speed than the countershaft 104 since the reduction gearing 102 has a reduction ratio.

As best seen in FIG. 4, the fixed sheave of the driving pulley 120 has a ring gear 130 connected thereto. The ring gear 130 engages a gear 132 disposed forwardly thereof. The gear 132 is selectively driven by a starter motor (not shown). To start the engine 24, the starter motor turns the gear 132, which in turn turns the ring gear 130. The ring gear 130 then drives the output shaft 118 and crankshaft which cause the initial movement of the pistons of the engine 24 necessary to start the engine 24.

Figure 7:
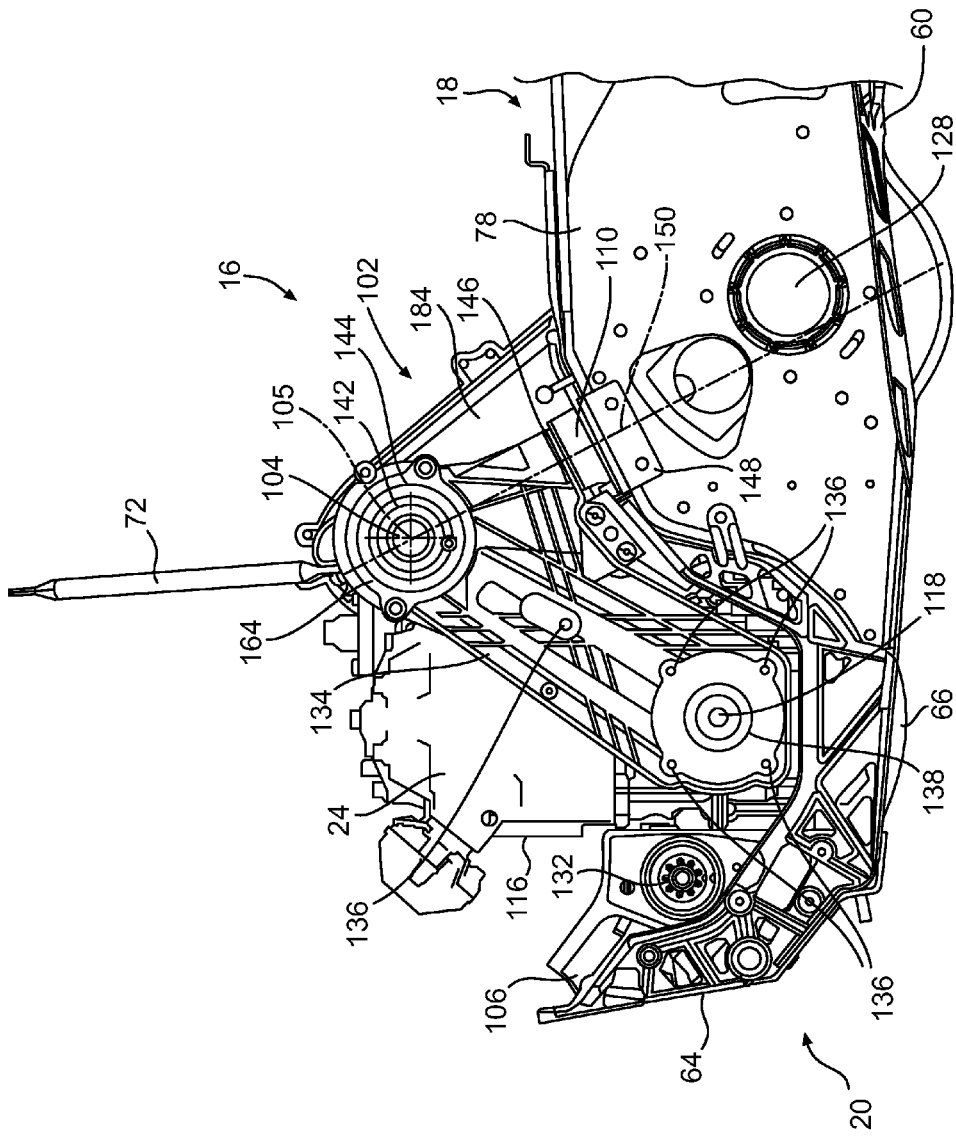
FIG. 7 is a left side elevation view of the forward portion of the frame and the power pack of FIG. 2, with the CVT removed for clarity.
Figure 8:
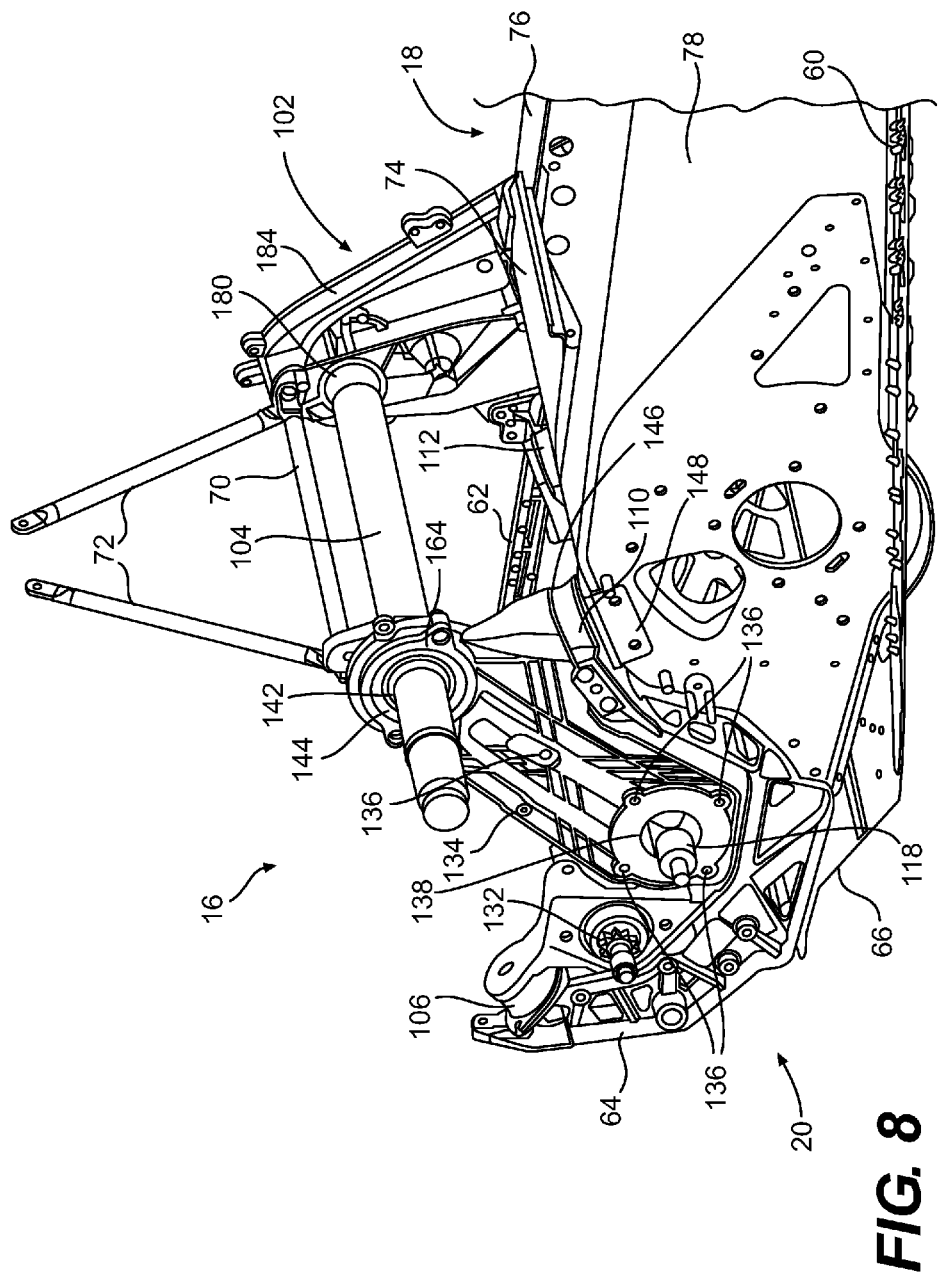
FIG. 8 is a perspective view taken from a rear left side of the forward portion of the frame and the power pack of FIG. 7, with the engine removed for clarity.

Turning now to FIGS. 7 to 12, the CVT mounting assembly will be described in more detail. As can be seen in FIG. 7, a bracket 134 is joined to the engine 24. More specifically, a lower portion of the bracket 134 is rigidly fastened by five fasteners 136 to the crankcase of the engine 24 on a left side of the engine 24. It is contemplated that the lower portion of the bracket 134 could be joined to another portion of the engine 24. It is also contemplated that the bracket 134 could be integrally formed with the casing of the engine 24 or some other portion of the engine 24. As can be seen, the lower portion of the bracket 134 defines an aperture 138 through which the output shaft 118 extends. The driving pulley 120 is mounted on the output shaft 118 such that the bracket 134 is disposed between the driving pulley 120 and the engine 24. It is contemplated that no aperture 138 could be defined in the bracket 134, in which case the output shaft 118 would not extend through the bracket 134 and the bracket 134 would be joined to the engine 24 at a position that would not interfere with the output shaft 118.

From its lower portion, the bracket 134 extends upwardly and rearwardly to its upper portion. The upper portion of the bracket 134 defines an aperture 140 (FIG. 11) through which the countershaft 104 extends. The driven pulley 122 is mounted on the portion of the countershaft 104 which extends to the left of the bracket 134. As will be described in greater detail below and as best seen in FIG. 11, a bearing 142 is disposed around the countershaft and a motion decoupler, in the form of bearing damper 144, is disposed around the bearing 142 to rotationally support the countershaft in the aperture 140.

As best seen in FIG. 7, the vibration damper 110 used to connect the engine 24 to the frame 16 is mounted between the upper portion of the bracket 134 and a top of the tunnel 18, rearwardly of the countershaft 104 and forwardly of the front drive axle 128. More specifically, the vibration damper 110 is fastened at one end thereof to a leg 146 extending from the bracket 134 and at the other end to an L-shaped bracket 148. The bracket 148 is fastened to the left side tunnel portion 78 and is supported by the bulkhead 68. The vibration damper 110 is generally shaped like a conical frustum. Note that the other vibration dampers 106, 108 and 112 are similarly shaped. The vibration damper 110 is positioned between the bracket 134 and the tunnel 18 such that a central axis 150 of the vibration damper 110 passes near the axis of rotation 105 of countershaft 104 and in front of the front drive axle 128. However, it is contemplated that the central axis 150 of the vibration damper 110 could pass through the countershaft 104 further away from the axis 105 thereof.

Figure 11:
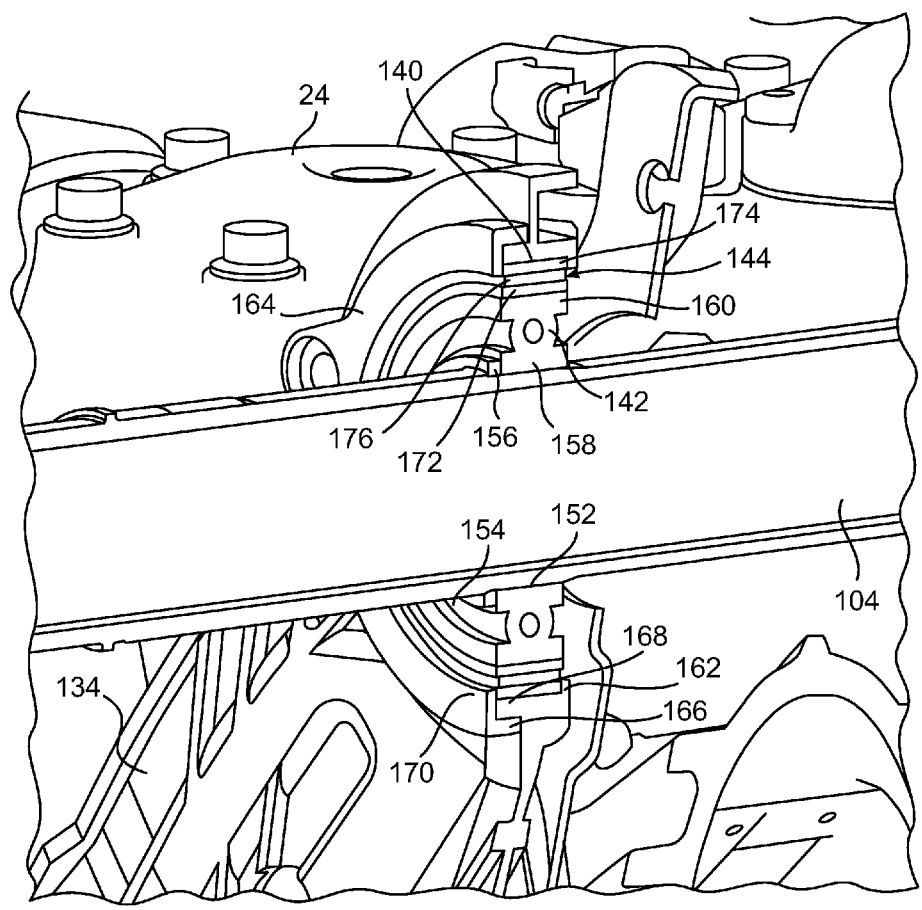
FIG. 11 is a close-up view of portion A-A of FIG. 10.

Turning now to FIG. 11, the connection of the countershaft 104 to the bracket 134 will be described in more detail. As can be seen, the countershaft 104 is hollow and has steps 152, 154 defined on an outer surface thereof. A ring 156 is mounted over step 152 and abuts the side of the step 154. The bearing 142, which in the present embodiment is a ball bearing, is press-fitted on the step 152 and the inner race 158 of the bearing 142 abuts the side of the ring 156.

Figure 13:
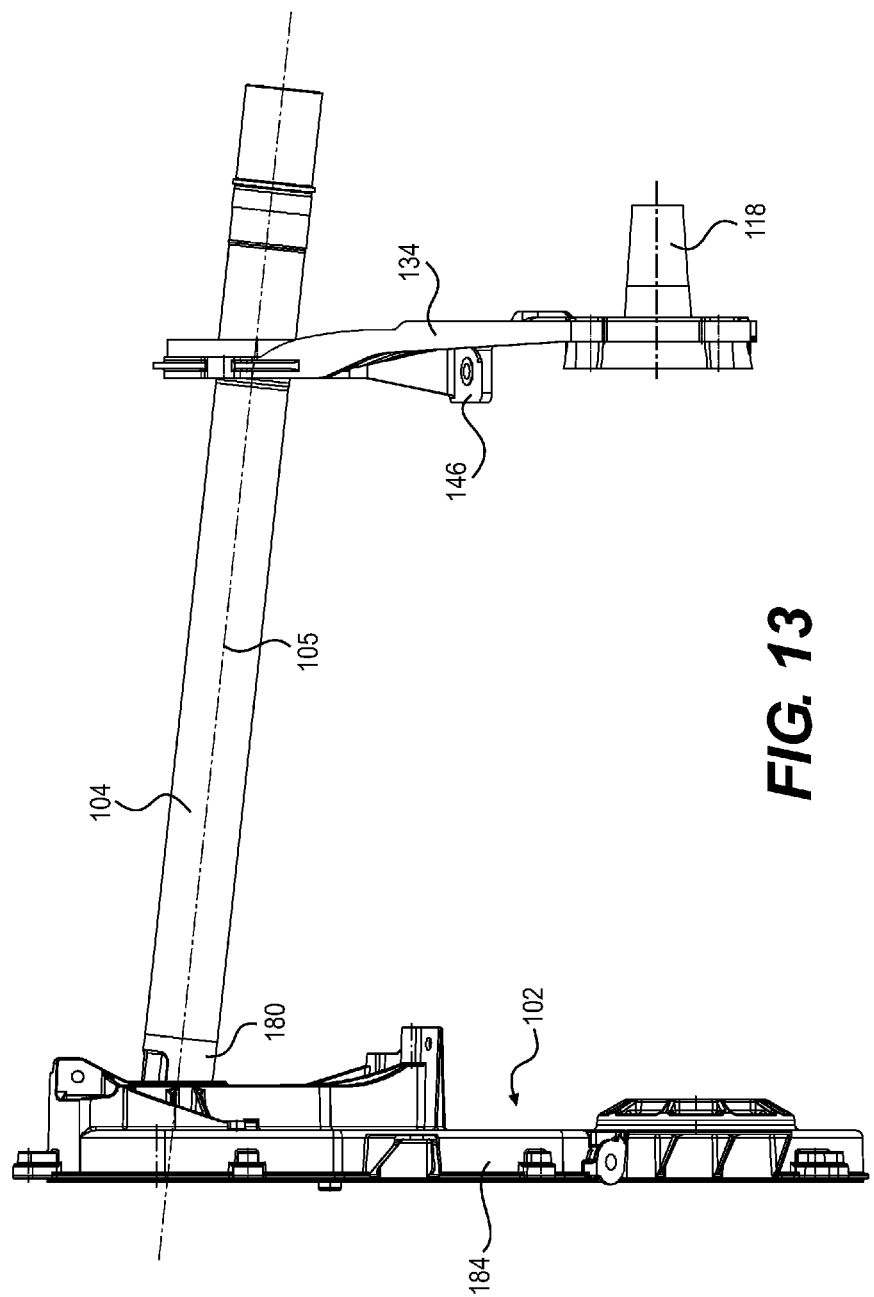
FIG. 13 is a front elevation view of the countershaft, the reduction gearing and a bracket of the snowmobile of FIG. 1 shown with the countershaft inclined as a result of movement of the engine.

The motion decoupler (bearing damper 144) is mounted radially between the bearing 142 and the side of the aperture 140 to compensate for axial deviation and inclination of the axis 105 of the countershaft 104 resulting from movement of the engine 24, and therefore the bracket 134, relative to the reduction gearing 102 to which the other end of the countershaft 104 is connected. An example of such a deviation is shown in FIG. 13. The bearing damper 144 is press-fitted on the outer race 160 of the bearing 142, such that the bearing 142 is disposed radially between the countershaft 104 and the bearing damper 144. The outer surface of the bearing damper is slide-fitted in contact with the sides of the aperture 140. The bearing damper 144 is held axially between a flange 162 formed by the bracket 134 and a cap 164. The cap 164 is disposed around the aperture 140 and is fastened to the bracket 134. The cap 164 has an L-shaped cross-section. The lateral leg 166 of the cap 164 is disposed around a circular flange 168 of the bracket 134 which is disposed around the aperture 140. The vertical leg 170 of the cap 164 extends over the aperture to retain the bearing damper 144 axially.

The bearing damper 144 consists of two metal rings 172, 174 and a rubber ring 176. The inner metal ring 172 is press-fitted on the outer race 160 of the bearing 142. The rubber ring 176 is disposed around the inner metal ring 172. The outer metal ring 174 is disposed around the rubber ring 176, radially between the rubber ring 176 and the side of the aperture 140. The outer metal ring 174 is the part of the bearing damper 144 that is disposed axially between the flange 162 and the leg 170 of the cap 164. In the present embodiment, the rubber ring 176 has a thickness of approximately 2 mm (approximately 0.07874 inch). However, it should be understood that the thickness of the rubber ring 176 to be selected depends on the amount of axial deviation and inclination of the axis 105 of the countershaft 104 that is expected and permissible without surpassing the capabilities of the bearing 142, the forces resulting from this movement, and the viscoelastic and other material properties of the type of rubber being used.

Figure 14:
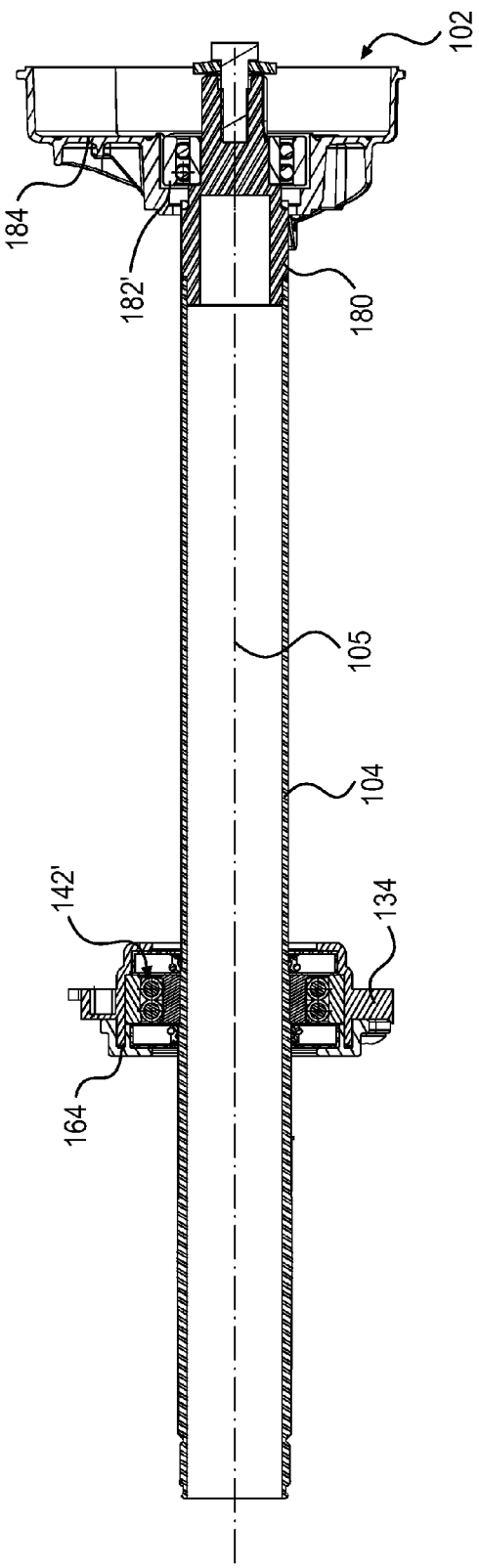
FIG. 14 is a cross-section of an alternative embodiment of the countershaft, the reduction gearing and the bracket of the snowmobile of FIG. 1 taken through a horizontal plane passing through the center of the countershaft.

It is contemplated that the motion decoupler could be a device other than the bearing damper 144. In the embodiment shown in FIG. 14, the bearing 142 and the bearing damper 144 have been replaced by a self-aligning ball bearing 142' which integrates the functions of a bearing and of a motion decoupler. One example of a self-aligning ball bearing 142' is the NSK 1208 self-aligning ball bearing. It is also contemplated that the bearing damper 144 could have a different structure than the one describe above. It is also contemplated that the motion decoupler could be mounted around the countershaft 104 with the bearing 142 disposed radially between the motion decoupler and the side of the aperture 140. It is also contemplated that two motion decouplers could be provided: one radially between the bearing 142 and the countershaft 104 and one radially between the bearing 142 and the side of the aperture 140.

Figure 10:
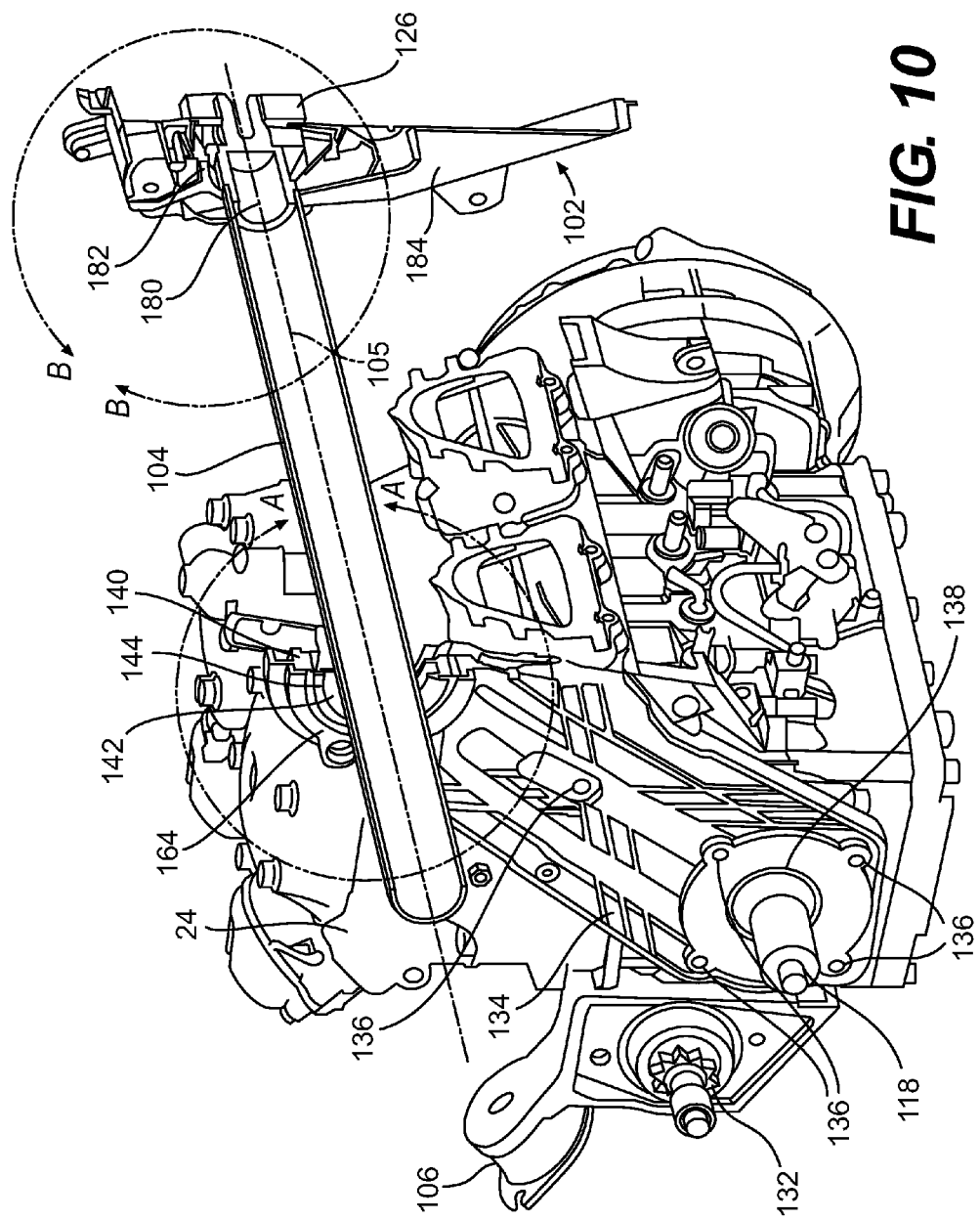
FIG. 10 is a partial cross-section of the engine, countershaft and reduction gearing of FIG. 9 taken through a vertical plane passing through a center of the countershaft.
Figure 12:
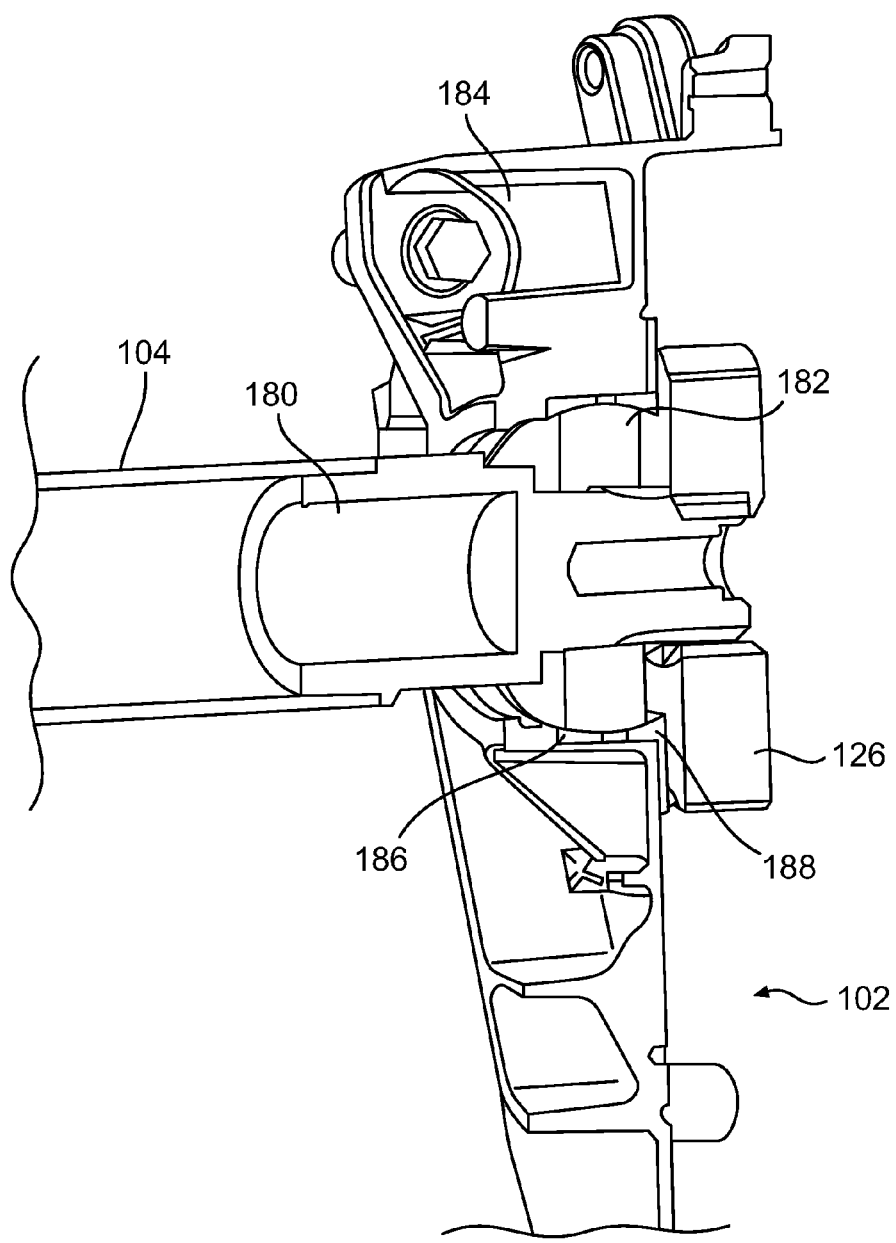
FIG. 12 is a close-up view of portion B-B of FIG. 10.

Turning back to FIG. 4, it can be seen that from the bracket 134, the countershaft 104 passes through an aperture 178 in the frame 16 as it extends towards the right of the snowmobile 10. It should be noted that the aperture 178 is sufficiently large that the countershaft 104 does not come in contact with the side of the aperture 178. As best seen in FIGS. 10 and 12, the right end of the countershaft 104 receives a sprocket shaft 180. One end of the sprocket shaft 180 is inserted in the countershaft 104 and the sprocket shaft 180 is press-fitted in the countershaft 104 and is welded to the countershaft 104. The other end of the sprocket shaft 180 is splined and extends inside the reduction gearing 102. The sprocket 126 has internal splines and is mounted on the splined end of the sprocket shaft 180. A spherical bearing 182 rotationally connects the sprocket shaft 180, and therefore the countershaft 104, to the housing 184 of the reduction gearing 102. The spherical bearing 182 allows for inclination of the axis 105 of the countershaft 104, and example of which is shown in FIG. 13. As can be seen, the spherical bearing 182 is disposed on the sprocket shaft 180 axially between the sprocket 126 and the end of the countershaft 104. The spherical bearing 182 is held on the housing 184 by two caps 186, 188. It is contemplated that the spherical bearing 182 could be replaced by a ball bearing and a bearing damper like the bearing 142 and the bearing damper 144 previously described to allow for axial deviation and/or inclination of the axis 105 of the countershaft 104. In the embodiment shown in FIG. 14, the spherical bearing 182 has been replaced by a self-aligning ball bearing 182'.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A snowmobile comprising:
a frame, the frame including:
an engine compartment; and
a tunnel rearward of the engine compartment;
a front suspension connected to the frame;
at least one ski connected to the front suspension;
an engine disposed in the engine compartment;
a bracket having a first portion joined to the engine and a second portion having an aperture defined therein;
an output shaft driven by the engine;
a countershaft passing through the aperture and being supported by the second portion of the bracket;
a motion decoupler disposed in the aperture around the countershaft radially between the countershaft and the second portion of the bracket, the countershaft being rotationally supported in the motion decoupler;
a driving pulley disposed on the output shaft and rotating therewith;
a driven pulley disposed on the countershaft and rotating therewith;
a drive belt looped around the driving and driven pulleys to transfer torque from the driving pulley to the driven pulley,
the driving pulley, the driven pulley and the drive belt together forming a continuously variable transmission; and
an endless drive track disposed below the tunnel for propelling the snowmobile, the endless drive track being operatively connected to the countershaft.

2. The snowmobile of claim 1, wherein the driving and driven pulleys are disposed on a first side of the engine; and further comprising a reduction gearing operatively connected to the countershaft on a second side of the engine opposite the first side.

3. The snowmobile of claim 2, further comprising a drive axle disposed in the tunnel, the drive axle being operatively connected to the reduction gearing for driving the endless drive track.

4. The snowmobile of claim 2, further comprising a spherical bearing rotationally connecting the countershaft to the reduction gearing.

5. The snowmobile of claim 1, wherein the countershaft is disposed rearwardly of the output shaft.

6. The snowmobile of claim 1, further comprising a bearing disposed radially between the countershaft and the motion decoupler.

7. The snowmobile of claim 6, wherein the motion decoupler is press-fit on the bearing.

8. The snowmobile of claim 6, wherein the bearing is a ball bearing.

9. The snowmobile of claim 1, wherein the motion decoupler is a damper.

10. The snowmobile of claim 9, wherein the damper includes a rubber ring.

11. The snowmobile of claim 10, wherein:
the damper further includes a first metal ring and a second metal ring; and
the rubber ring is disposed radially between the first and second metal ring.

12. The snowmobile of claim 1, further comprising a cap fastened to the second portion of the bracket, the cap retaining the motion decoupler in the aperture.

13. The snowmobile of claim 1, further comprising a vibration damper connecting the second portion of the bracket to the tunnel.

14. The snowmobile of claim 13, wherein a central axis of the vibration damper passes through the countershaft.

15. The snowmobile of claim 13, further comprising a drive axle disposed in the tunnel, the drive axle being operatively connected to the reduction gearing for driving the endless drive track; and
wherein a central axis of the vibration damper passes in front of the drive axle.

16. The snowmobile of claim 13, wherein the vibration damper is disposed rearwardly of the countershaft.

17. The snowmobile of claim 13, further comprising a drive axle disposed in the tunnel, the drive axle being operatively connected to the reduction gearing for driving the endless drive track; and wherein the vibration damper is disposed forwardly of the drive axle.

18. The snowmobile of claim 1, wherein the first portion of the bracket is fastened to a side of the engine.

19. The snowmobile of claim 1, wherein:

the aperture is a first aperture;

the first portion of the bracket defines a second aperture therein; and the output shaft passes through the second aperture.

20. The snowmobile of claim 1, wherein:

the countershaft has an axis of rotation; and the motion decoupler allows for at least one of axial deviation and inclination of the axis of the countershaft relative to the bracket.

\* \* \* \* \*